March 23, 1954  H. C. HIBBARD  2,672,758
PREVENTING FLUID PRESSURE GAUGE HYSTERESIS
Filed Oct. 21, 1949  2 Sheets-Sheet 1

Haines C Hibbard Inventor
By W. D. Heilman Attorney

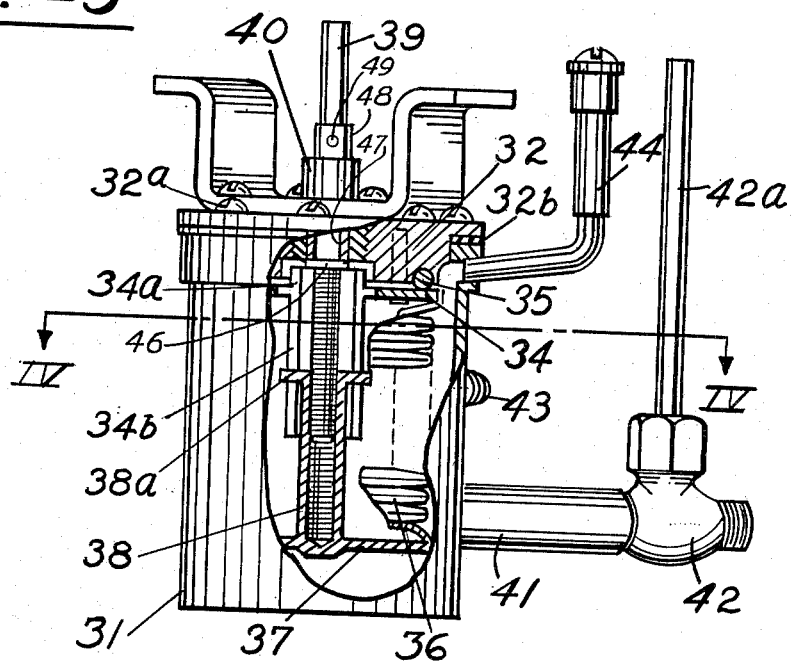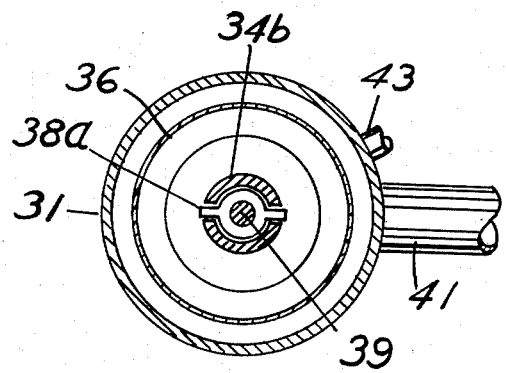

Patented Mar. 23, 1954

2,672,758

UNITED STATES PATENT OFFICE 2,672,758

PREVENTING FLUID PRESSURE GAUGE HYSTERESIS

Haines C. Hibbard, Tulsa, Okla., assignor to Standard Oil Development Company, a corporation of Delaware Application October 21, 1949, Serial No. 122,779

3 Claims. (Cl. 73—432)

The present invention relates to a means for preventing hysteresis in a gage or meter system in which a pressure recording or indicating instrument normally may be subjected to pressure effects for a period longer than that required for indicating or recording such pressure. More particularly, the invention relates to a means for intermittently relieving indicating pressure on such an instrument, especially when employed in a closed fluid system, and contemplates a means by which the instrument may be restored to a standard condition of minimum mechanical stress or to a zero reading.

The invention may be more fully understood from the following description when read in conjunction with the accompanying drawings, in which:

Figure 3 is a side elevational view of a pressure relief means according to the invention with parts broken away and partly in vertical section; and, Figure 4 is a cross-sectional view through the means of Figure 3, taken along the line IV—IV thereof.

Figure 1:
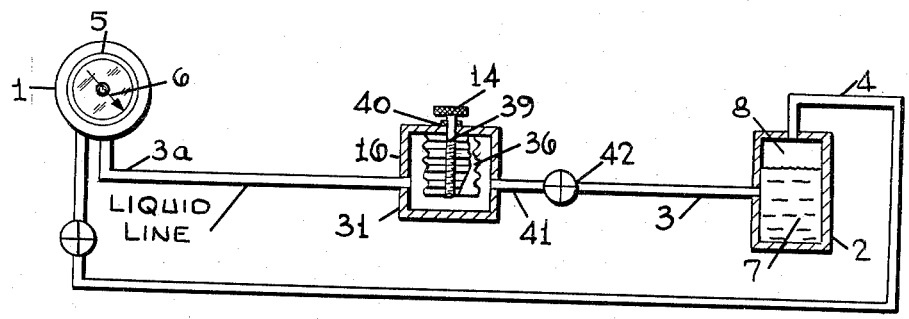
Figure 1 is a semi-diagrammatic view of a pressure-responsive hydraulic system including a means of the present invention for relieving pressure on the pressure-responsive instrument employed.

Referring more specifically to the drawings, in which like parts are designated by the same numerals, the numeral 1 designates a differential pressure gage having an indicating dial or scale 5, and a rotatable hand 6. The numeral 2 designates a closed fluid reservoir containing a body of liquid 7, which is maintained in the reservoir at an intermediate level with an air space 8 above the liquid. The instrument 1 and reservoir 2 are inter-connected by means of a flexible liquid line or conduit 3, and an air line or conduit 4. The liquid used in the system may be any liquid having satisfactory properties, such that it will remain in liquid form at a substantially constant viscosity and density within the range of temperatures to be encountered in operation, have a vapor pressure and density as low as feasible, and not have a corrosive effect on any part of the apparatus of the system. Normally, water is quite suitable for the purpose provided it is de-aerated before introduction into the system. Where low temperature operation is contemplated and water is used, it will be desirable to add a suitable anti-freeze material.

For the purposes later described, a valve 42 is provided in the line 3 between the reservoir 2 and gage 1. Preferably valve 42 is positioned adjacent the gage 1. Interposed in the line 3 between gage 1 and valve 42 is a variable volume receiver 16 communicating with the gage through the line 3a and with valve 42 through inlet 41.

Figure 2:
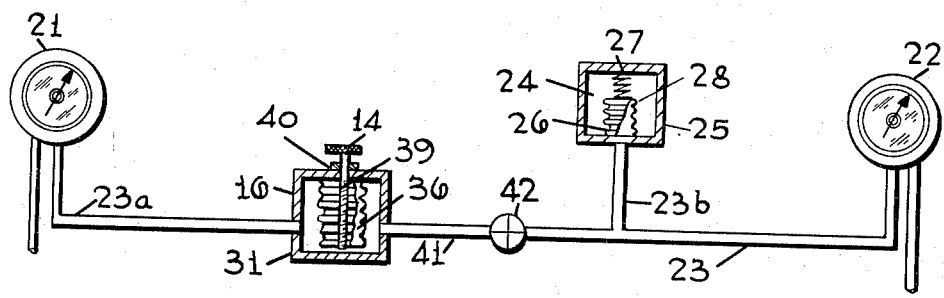
Figure 2 is a similar view of another form of system illustrated in Figure 1.

The variable volume receiver 16 may be of any suitable construction. As illustrated in Figures 1 and 2, a housing 31 is provided interiorly with an annular bellows member 36 secured in fluid-tight relation at one end to the top or to a wall of the receiver 16. A bellows-adjusting bolt or rod 39 extends through the top or wall of the receiver into the bellows and is rotatably held by the bearing member 40. The lower end of the rod threadedly engages a suitable member fixed to the bellows whereby rotation of the rod will compress or expand the bellows member 36 without rotation of the bellows. The knurled cap portion 14 provides for adjustment and rotation of the bolt 39 for compression or expansion of the bellows 36 within the housing 31, whereby the effective volume between the bellows and the walls of housing 31 may be varied as desired.

In operation, as for the purpose of determining a difference in elevation between spaced points in an area to be surveyed, the reservoir 2 may be spotted at any given point in the area while the instrument 1 is disposed or located at another point in the area uphill or downhill from the reservoir. If the instrument is located downhill from the reservoir, liquid will tend to flow by gravity from the reservoir through the line 3 toward the instrument exerting a positive pressure on the instrument through the line 3, which may be indicated or recorded by the gage and observed by means of a rotatable hand 6 and the scale 5. The slight flow of liquid through line 3 is compensated by a corresponding slight flow of air through the line 4 from the instrument to the reservoir. Where the instrument may be located uphill from the reservoir, liquid in the line 3 tends to flow out of the sensitive element of the instrument toward the reservoir 2, thereby slightly reducing the liquid volume in the sensitive element so that it indicates a reduced pressure. The slight decrease in volume is compensated for by a slight flow of air from the reservoir to the instrument through line 4.

The instrument or pressure gage 1 is of a generally conventional type, the scale 5 being provided with both negative and positive markings, with a zero point between, and preferably for direct reading, in plus or minus feet of elevation.

The instrument 1 is also provided with means not shown for zero adjustment, and may be simply calibrated by elevating the reservoir 2 above the instrument 1 in one-foot increments thereby directly indicating on the scale the elevation of the reservoir, and vice versa for the negative side of the scale.

Normally the valve member 42 will be opened so as to provide for direct communication between the reservoir and the instrument through the variable volume receiver. When, in operation, a reading has been taken from the instrument, the pressure thereon may be relieved by means of the variable volume receiver and the valve 42 in line 3. The valve member is then closed. Then, by turning the knob 14 so as to pull the bellows 36 upwardly, liquid in the instrument and the other portion of line 3 may be withdrawn into the variable volume annular receiver comprising the space between the bellows 36 and the walls of housing 31, relieving pressure on the instrument and returning the hand 6 to its zero point.

To take a new reading, the instrument 1 may then be carried uphill from the reservoir 2 in the area being surveyed. Communication between the reservoir 2 and the instrument 1 may then be restored by opening the valve 42. The reading shown on the instrument 1 will be a negative one. After the reading has been taken the hand 6 may be restored to the zero point by closing the valve member 42 and expanding bellows 36, by means of knob 14, reducing the volume of the annular receiver and compensating for the negative pressure exerted on the instrument.

If, as may occur, the reservoir liquid tends to accumulate in the variable volume receiver, it may be restored to the system and to the reservoir by opening the valve member 42 and proceeding as follows: With the instrument and the reservoir on the same level, bellows 36 is expanded by means of knob 14. The pressure imposed on the liquid contained within the variable volume receiver will be equalized in the system due to the fact that all portions thereof will be at substantially the same level and in free communication with each other through the lines 3 and 4. The necessity for returning any such accumulation, however, will be infrequent inasmuch as the volume of liquid required to be withdrawn to the receiver under any circumstances will be comparatively small to obtain the relief of pressure on the instrument 1. Furthermore, where the positions of the instrument and the reservoir are successively reversed in operation, the inflow of liquid into the receiver will be substantially balanced by the outflow therefrom in order to relieve negative pressure on the instrument.

In the system as illustrated by Figure 2, differential pressure gages are employed. A gauge 21 is connected to a gage 22 by means of a liquid line or conduit 23. Communicating with this conduit is a pressure reservoir 24 composed of a housing 25 in which is disposed a bellows element 26 having a cap plate 28 at one end and secured in fluid-tight relation to the housing at the other end. A branch line 23b communicates between the line 23 and the interior of the bellows through the end of the housing to which the bellows is secured. The bellows element 26 in the structure illustrated is held under constant compression as by a spring member 27 disposed between the cap plate 28 and an adjoining wall of the housing. If desired, means not shown may be provided for adjusting tension of the spring and thereby regulating pressure on the system through the liquid. The differential pressure gages employed may be of any conventional form in which one side of each gage is connected to the line 23 and the other side is subjected to atmospheric pressure. The scale and indicating means of the gage members may be substantially similar to those described in reference to Figure 1. In addition to the constant pressure, liquid reservoir 24 communicating with the line 23, there are also provided a valve 42 and a variable volume receiver 16 communicating with the line 23 in the same fashion as illustrated and described with reference to Figure 1, and for the same purpose, line 23a connecting the variable volume receiver with gage 21.

In the systems as illustrated and described with reference to Figures 1 and 2, it is preferred that an enhanced pressure be maintained therein although the systems may be operated under atmospheric pressure. By maintaining an enhanced pressure on either form of the system, leakage of air into the system is substantially prevented and any defects in the equipment tending to produce leakage are more readily discoverable. In preventing the uncontrolled entrance of air into the system, the re-solution thereof in the liquid employed is prevented, and the effective density of the liquid is thereby maintained more nearly constant. In the use of the embodiment illustrated in Figure 2, the difference between the reading of the pressure gages 21 and 22 will be the significant figure.

In Figures 3 and 4 are presented details of a variable volume receiver for use in the manner described above. Numeral 31 designates a cup-shaped housing provided with an annular cap 32 secured to the housing in fluid-tight relation as by screws 32a, a seal 32b being provided between the cap and the upper end of the housing.

Under the surface of the cap 32 is a guide member 34 which, as shown, is composed of a cylindrical center portion 34a, flanged at its upper end and secured to the cap 32 by means of screws in said cap that engage said flange. A fluid-tight seal is maintained between the flange and the under-surface of the cap by a sealing member 35. The cylindrical portion 34a may be provided with internal longitudinal grooves or, as shown, may be provided with opposing parallel longitudinal slots 34b. Secured to the flange of the element 34 in fluid-tight relation thereto, and dependent therefrom is an annular bellows element 36. The opposite end of the bellows member 36 is provided with a closure plate 37 having a concentric upstanding guide rod portion 38, provided with ears 38a at the upper end thereof, adapted to be engaged in the slotted portions 34b of the member 34, or by internal longitudinal grooves where provided. The guide rod 38 is concentrically tapped and threaded to receive the threaded end of an adjusting rod 39 extended into the interior of the bellows through a bearing member 40 threaded into central opening of the annular cap 32. An enlarged shoulder 49 on the adjusting rod 39 presses against a bushing 47 within the bearing 40 and is thus prevented from being moved upward with respect to the cap 32. Downward travel of the rod 39 is prevented by collar 48 which is fixed to rod 39 by a taper pin or set screw 49. Thus rod 39 is rotatably held by cap 32. The housing 31 is provided with an inlet 41 equipped with a shutoff valve 42 having a valve stem 42a, and with an outlet 43. The inlet 41 is provided for connection through valve 42 with the liquid line 3 or 23 shown in the systems illustrated by Figures 1 and 2 respectively, while the outlet line 43 is provided for direct connection to the liquid side of either the instrument 1 of Figure 1 or the instrument 21 of Figure 2, and thus corresponds to lines 3a and 23a respectively of Figures 1 and 2. A bleeder valve 44 is connected to the housing for evacuating air from the liquid side of the system.

When it is desired to relieve a positive pressure on either instrument 1 or instrument 21, the valve 42 is closed and by rotating the rod 39 so as to cause it to be threaded into the tap rod 38, drawing the rod 38 and plate 37 upwardly within the housing 31, and compressing the bellows 36, whereby the effective volume of the housing is increased to accommodate for the positive pressure which may exist in the instrument to which the housing is connected by way of outlet 43. Where a negative pressure on the instrument is to be relieved, the rod 39 is rotated so as to be withdrawn from the threaded portion of the rod 38, forcing the plate away from the cap 32 expanding the bellows 36 and reducing the effective volume of the housing 31.

The general concept of the present invention is that means are provided in a fluid pressure system to prevent the hysteresis of a recording gage by removing fluid from said system into a supplementary reservoir, from which reservoir the fluid may be reintroduced into said system by suitable means at the time it is desired to take additional readings.

What is claimed is:

1. A pressure responsive apparatus for measuring differences in elevation between spaced points comprising a closed hydraulic system including a flexible conduit for liquid, a body of liquid filling said conduit, a fluid pressure gage normally subject to hysteresis effects connected to one end of said conduit, a reservoir for fluid connected to said conduit at a point remote from said pressure gage, a body of liquid in said reservoir communicating with said liquid in said conduit, a receiver for fluid having a pair of connections and connected in said conduit between said gage and said reservoir, a valve in said conduit, said valve being operable to isolate said reservoir from said gage and from said receiver, and means for adjusting the fluid capacity of said receiver whereby on isolation of said reservoir by said valve, pressure may be relieved on said gage irrespective of differential liquid pressure existing between said gage and said reservoir.

2. Apparatus as defined by claim 1 wherein said pressure gage is a differential pressure gage, including a second flexible conduit connected at one end to said reservoir above the body of liquid therein and at its other end to said pressure gage, said second conduit being capable of holding a gas under pressure, whereby said liquid within the reservoir and said liquid within said first named conduit may be maintained under an enhanced pressure higher than atmospheric pressure.

3. Apparatus as defined by claim 1 in which said pressure gage is a differential pressure gage, and including a second differential pressure gage connected to the other end of said conduit, said reservoir being connected to said conduit at a point intermediate its ends, said reservoir having a flexible wall portion and a rigid wall portion and a spring arranged between said flexible wall portion and said rigid wall portion in a manner holding said flexible wall portion in compression, whereby said liquid within said reservoir and said liquid within said first named condut may be maintained under an enhanced pressure higher than atmospheric pressure.

HAINES C. HIBBARD.

References Cited in the file of this patent

UNITED STATES PATENTS

| Number | Name | Date |
|---|---|---|
| 936,407 | Bunting | Oct. 12, 1909 |
| 1,507,242 | Meriam | Sept. 2, 1924 |
| 1,566,174 | Tyler | Dec. 15, 1925 |
| 1,643,469 | Reeves | Sept. 27, 1927 |
| 1,840,748 | Star | Jan. 12, 1932 |
| 2,230,280 | Yeatman | Feb. 4, 1941 |
| 2,295,957 | Laurencelle | Sept. 15, 1942 |
| 2,334,119 | Mulholland | Nov. 9, 1943 |
| 2,554,659 | Branson | May 29, 1951 |
| 2,557,021 | Williams | June 12, 1951 |

FOREIGN PATENTS

| Number | Country | Date |
|---|---|---|
| 21,099 | Great Britain | 1904 |
| 506,054 | France | May 21, 1920 |
| 215,101 | Great Britain | May 5, 1924 |
| 291,150 | Great Britain | May 24, 1928 |
| 165,098 | Switzerland | Jan. 16, 1934 |
| 301,098 | Italy | 1936 |